(12) United States Patent
Kurokochi et al.

(10) Patent No.: US 8,543,104 B2
(45) Date of Patent: Sep. 24, 2013

(54) RADIO DEVICE, STATE DETECTION METHOD AND SYSTEM

(75) Inventors: Fumiyasu Kurokochi, Kawasaki (JP); Michiko Anbe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 12/546,018

(22) Filed: Aug. 24, 2009

(65) Prior Publication Data

US 2010/0056135 A1    Mar. 4, 2010

(30) Foreign Application Priority Data

Sep. 1, 2008  (JP) ................................. 2008-223549

(51) Int. Cl.
*H04W 24/00* (2009.01)
(52) U.S. Cl.
USPC ............................ 455/424; 455/423; 455/425
(58) Field of Classification Search
USPC ......................................................... 455/424
See application file for complete search history.

(56) References Cited

U.S. PATENT DOCUMENTS

| | | | | |
|---|---|---|---|---|
| 5,157,661 A | * | 10/1992 | Kanai et al. | 370/331 |
| 5,884,163 A | * | 3/1999 | Hardouin | 455/423 |
| 7,257,378 B2 | * | 8/2007 | Pinola | 455/67.11 |
| 2002/0173275 A1 | * | 11/2002 | Coutant | 455/67.1 |
| 2003/0096611 A1 | * | 5/2003 | Cooper | 455/434 |
| 2006/0068769 A1 | * | 3/2006 | Adya et al. | 455/418 |
| 2008/0062906 A1 | * | 3/2008 | Baker et al. | 370/315 |
| 2010/0046470 A1 | | 2/2010 | Sekiya | |
| 2010/0248640 A1 | * | 9/2010 | MacNaughtan et al. | 455/67.11 |
| 2011/0059736 A1 | * | 3/2011 | Norrman et al. | 455/424 |

FOREIGN PATENT DOCUMENTS

| | | |
|---|---|---|
| JP | 09-186687 | 7/1997 |
| JP | 10-013323 | 1/1998 |
| JP | 10-242899 | 9/1998 |
| WO | 2008-090914 | 7/2008 |

OTHER PUBLICATIONS

Notice of Reason for Refusal issued for corresponding Japanese Patent Application No. 2008-223549 dated Jul. 24, 2012 with partial English translation.

* cited by examiner

*Primary Examiner* — Charles Appiah
*Assistant Examiner* — Mazda Sabouri
(74) *Attorney, Agent, or Firm* — Myers Wolin, LLC

(57) ABSTRACT

A radio device in a first base transceiver station for communicating with a mobile station located in a radio propagation area of the first base transceiver station, the radio device includes a test target selection processing unit for identifying a mobile station located in an area covered with both the radio propagation area of the first base transceiver station and a radio propagation area of a second base transceiver station established adjacent to the first base transceiver station, and a test request processing unit for transmitting a test request signal having information concerned with the second base transceiver station to the mobile station identified by the test target selection processing unit so that the mobile station executes a connection test on the second base transceiver station, and for processing a test result signal responded by the mobile station.

13 Claims, 14 Drawing Sheets

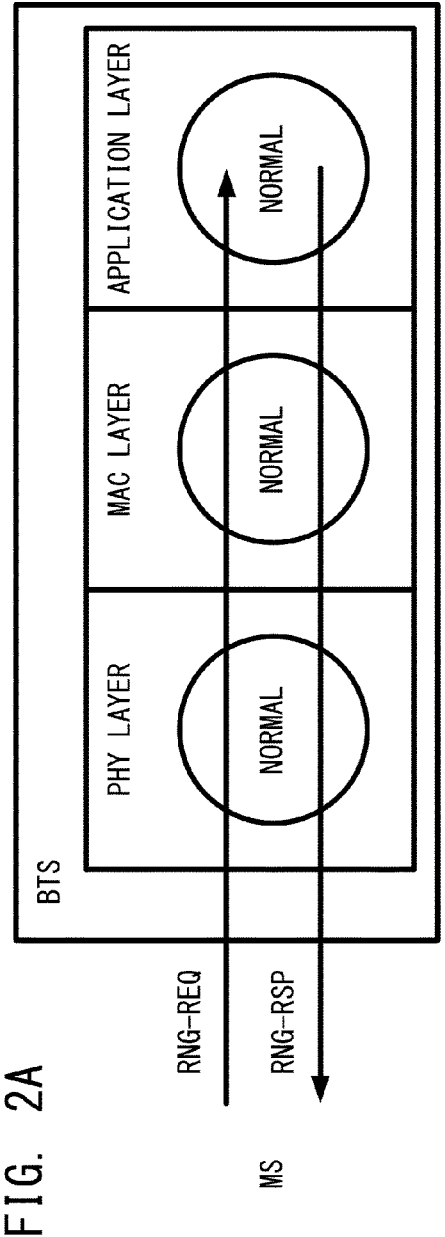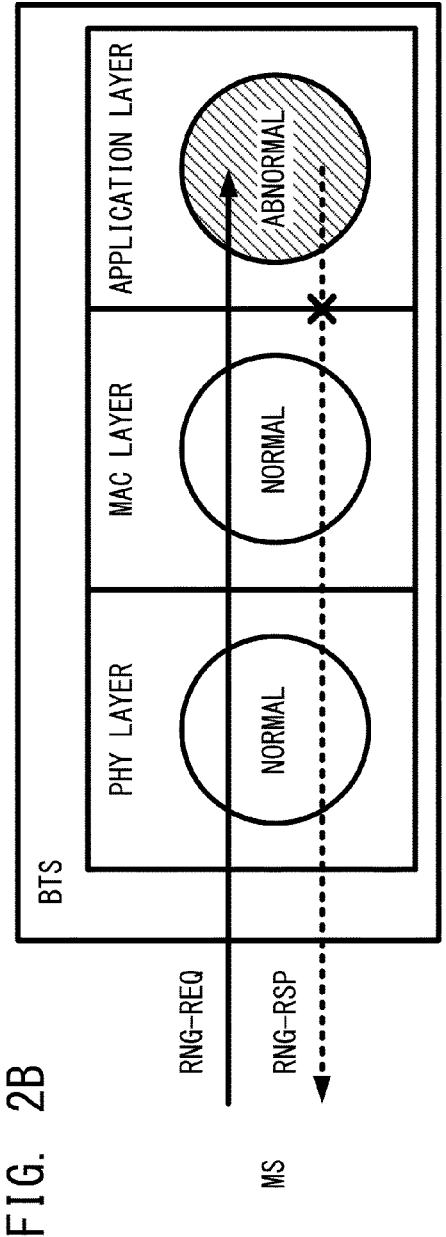

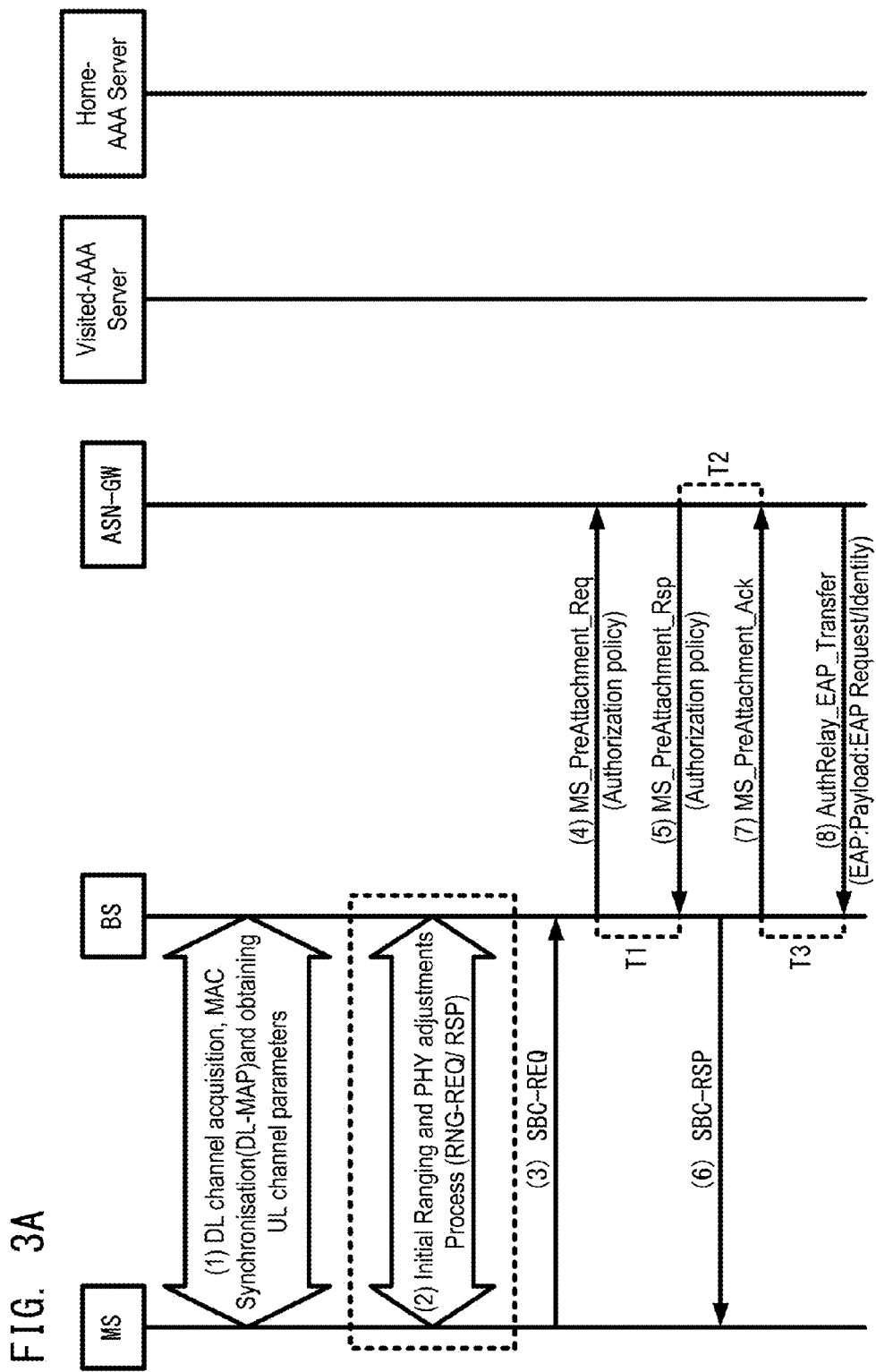

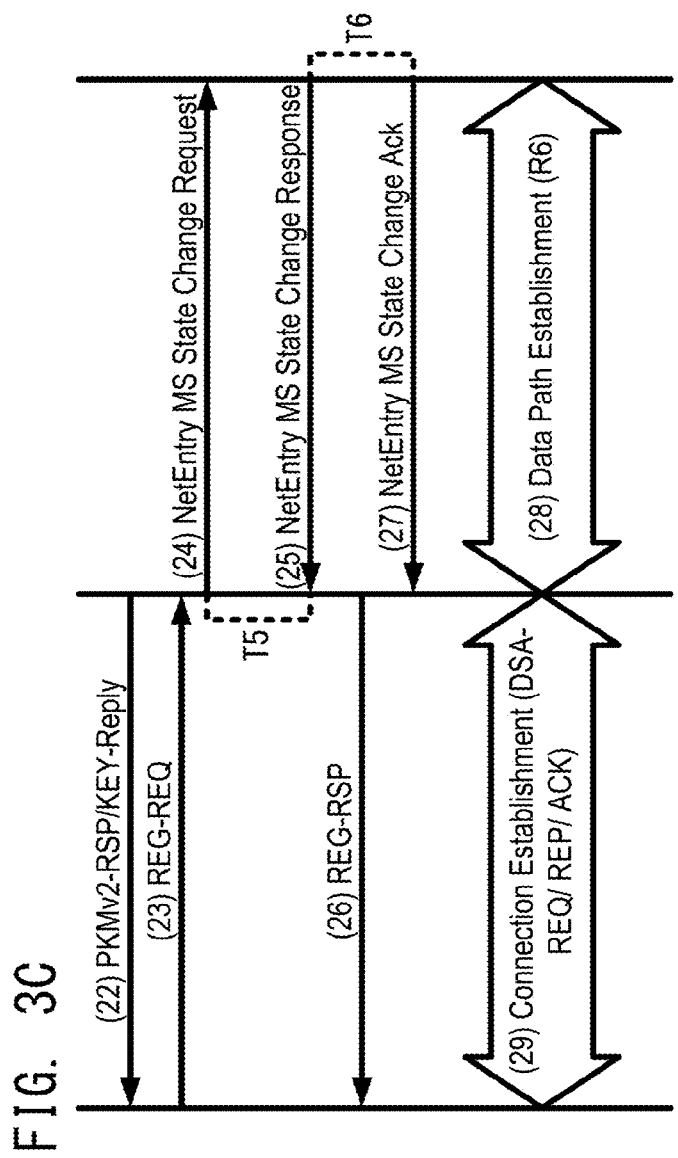
FIG. 3C  Figure 5-22 MS Initial Network Entry (Single EAP)

RADIO DEVICE, STATE DETECTION METHOD AND SYSTEM

CROSS-REFERENCE TO RELATED APPLICATIONS

This application is based upon and claims the benefit of priority of the prior Japanese Patent Application No. 2008-223549, filed on Sep. 1, 2008, the entire contents of which are incorporated herein by reference.

FIELD

The embodiments discussed herein are related to a radio device in a base transceiver station, a state detection method in a base transceiver station and a state detection system.

BACKGROUND

A communication failure caused by a software bag or an error in operation might stop a controlling part in a base transceiver station for connecting with a mobile station (for example, mobile terminal, portable terminal) without an alarm generation in a 3GPP (third generation partnership project) system using W-CDMA (wideband code division multiple access), UMTS (universal mobile telecommunication system), or the like or a mobile communication system using WiMAX (worldwide interoperability for microwave access) or the like.

If a base transceiver station is placed in such a state, the base transceiver station makes no response to a connection request from a mobile station and falls into a situation where communications may not be performed. Such a state, that is, a state in which a base transceiver station makes no response to a mobile station will be referred to as a "silent state."

As a method for detecting such a "silent state" of a base transceiver station, Japanese Laid-open Patent Publication No. 10-13323 discloses that a test mobile station is provided at each base transceiver station, the mobile station is connected to a maintenance network of the base transceiver stations so that control for a call can be performed remotely, and when a user complaint is received or when a periodical test is performed, control for a call is performed on a test mobile station so as to check whether the base transceiver station in question can be connected.

However, in this case, a special test terminal is provided at each base transceiver station, so the costs of base transceiver stations or the installation cost are increased.

Also, it is conceivable to determine whether a base transceiver station is placed in a "silent state" by checking a user traffic based on such as statistic data collected from base transceiver stations. However, in this case, it is necessary to compare whether there is actually no user traffic or whether there appears to be no user traffic due to an abnormality of a base transceiver station, with normal traffic situation or the like.

For this reason, the past data is also referred to for analysis. Therefore, time is required until a "silent state" of a base transceiver station is detected.

SUMMARY

According to an aspect of the embodiment, a radio device in a first base transceiver station for communicating with a mobile station located in a radio propagation area of the first base transceiver station, the radio device includes a test target selection processing unit for identifying a mobile station located in an area covered with both the radio propagation area of the first base transceiver station and a radio propagation area of a second base transceiver station established adjacent to the first base transceiver station, and a test request processing unit for transmitting a test request signal having information concerned with the second base transceiver station to the mobile station identified by the test target selection processing unit so that the mobile station executes a connection test on the second base transceiver station, and for processing a test result signal responded by the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A-2B are diagrams illustrating cases where a base transceiver station is normal and a base transceiver station is placed in a "silent state";

FIGS. 3A-3C are diagrams illustrating one example of a transmission sequence of a message in WiMAX;

DESCRIPTION OF EMBODIMENTS

Hereinafter, embodiments will be described in accordance with the drawings.

First Embodiment

Figure 1:
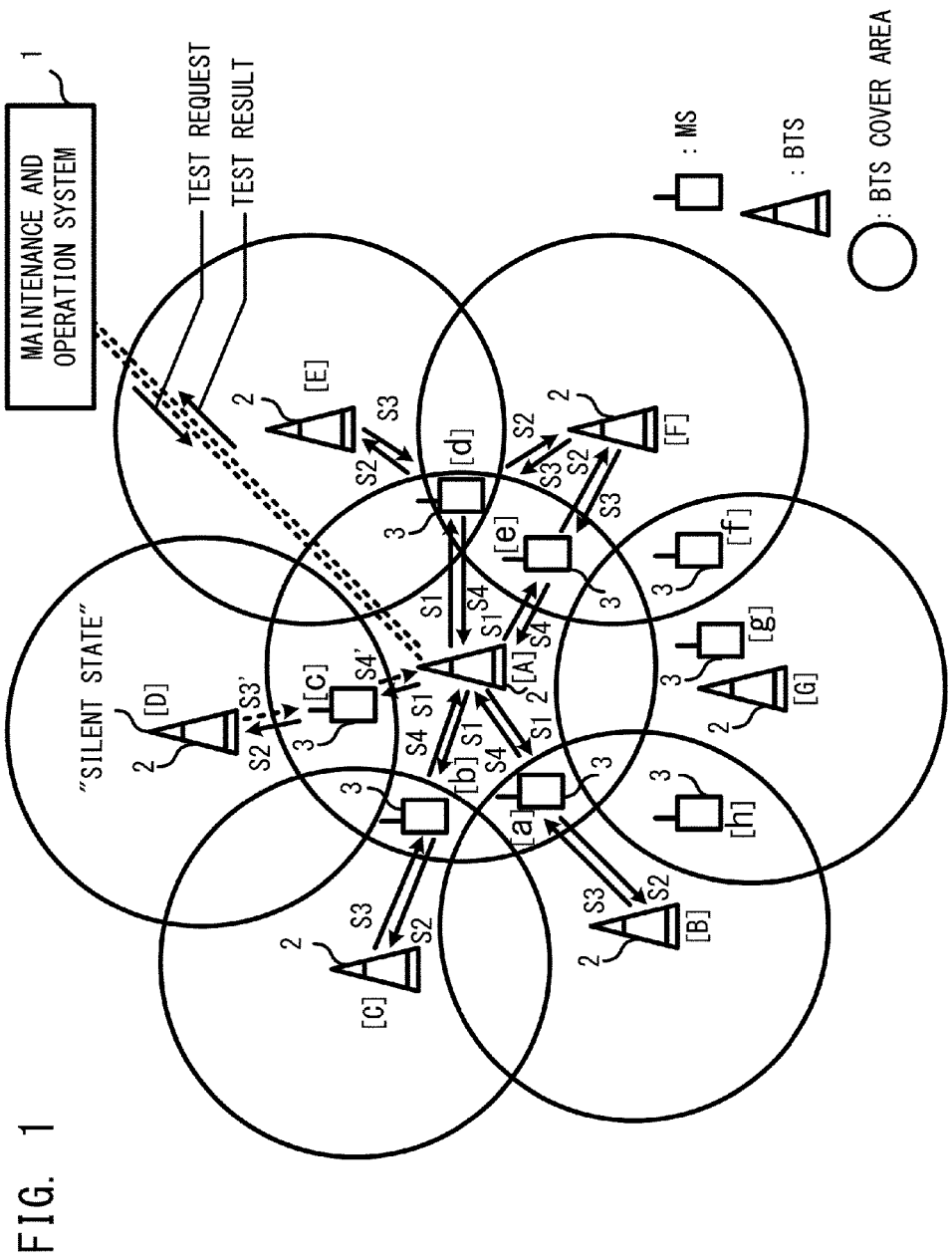
FIG. 1 is a diagram illustrating operations of embodiments.

FIG. 1 is a diagram illustrating operations of embodiments. Hereinafter, there are some cases where base transceiver station, and mobile station are referred to as BTS, and MS respectively. And the mobile station is, for example, a mobile terminal or portable terminal or the like.

Suppose that a base transceiver station 2[A] has received a test request from a maintenance and operation system 1 in FIG. 1. The base transceiver station 2[A] transmits connection test requests S1 used for instructing performance of connection tests on base transceiver stations 2[B] to 2[G] established adjacent to the base transceiver station 2[A], to mobile stations 3 existing within the cover area (radio propagation area) of the base transceiver station 2[A].

The messages (signals) of the connection test requests S1 each include information about the base transceiver stations that are the test targets and are adjacent to the base transceiver station 2[A]. In an example indicated in FIG. 1, the information about the base transceiver stations are able to specify the adjacent base transceiver stations 2[B] to 2[G].

At this case, the adjacent base transceiver stations that are the test targets are specified based on information of the adjacent base transceiver station that is set as hand-over destinations for each base transceiver station 2 in advance. Generally, this information of the adjacent base transceiver station is set for each base transceiver station 2 so as to indicate, to a mobile station 3, what base transceiver stations exist around as candidates for a hand-over destination when a hand-over process is performed.

An adjacent base transceiver station set as a hand-over destination is typically located in such a manner that the cover areas of the base transceiver stations 2 overlap each other so that a mobile station 3 can continuously communicate in moving. Therefore, there exists an area where a mobile station 3 can make connections to the base transceiver stations 2 of both the hand-over source and the hand-over destination.

The embodiment in FIG. 1 is an example where the connection states of the adjacent base transceiver stations 2[B] to 2[G] are checked from the centered base transceiver station 2[A] using mobile stations 3 (mobile stations 3[a] to 3[e] in the example indicated in FIG. 1) existing in the overlaps between the cover areas.

According to the connection test requests S1 from the base transceiver station 2[A], the mobile stations 3[a] to 3[e] perform connection tests S2 on the specified base transceiver stations 2[B] to 2[G] adjacent to the base transceiver station 2[A].

The mobile stations 3[a] to 3[e] receive the messages of the connection test requests S1 from this base transceiver station 2[A] and perform connection tests S2 on the corresponding adjacent base transceiver stations 2[B] to 2[G].

When receiving the connection tests S2 from the mobile terminals 3[a] to 3[e], the adjacent base transceiver stations 2[B] to 2[G] return connection test responses S3 to the mobile stations 3[a] to 3[e].

The adjacent base transceiver stations 2[B] to 2[G] returns connection test responses S3 in response to the connection tests S2 from the mobile stations 3[a] to 3[e]. The connection tests may also be performed by using existing call processing messages without creating special messages for tests.

For WiMAX, it is possible to use, for example, an initial ranging message (RNG-REQ) from a mobile station 3 and a response message (RNG-RSP) from a base transceiver station 2 that are used in the initial stage of a connection sequence.

When call processing applications are normally running at the base transceiver stations 2[B] to 2[G], RNG-RSP messages for response are returned in response to initial ranging messages (RNG-REQ) from the corresponding mobile stations 3[a] to [e]. Thus, it is confirmed that the base transceiver stations 2 are normally operating.

FIGS. 2A-2B are diagrams illustrating cases where a base transceiver station is normal and a base transceiver station is placed in a "silent state".

When an initial ranging (RNG-REQ) message is transmitted from a mobile station 3 to a base transceiver station 2, the message is passed on to the application layer via the physical layer and MAC layer in the base transceiver station. As indicated in FIG. 2A, if the layers of the base transceiver station are each normal, an RNG-RSP message for response is returned.

If the application layer of a base transceiver station is abnormal due to a bug or the like, the RNG-RSP message for response is not created and thus no response is returned as indicated in FIG. 2B. That is, the base transceiver station is placed in a "silent state".

If the mobile station 3 transmits no subscribers station basic capability request (SBC-REQ) messages when performing the connection tests, no further communications occur after the above-mentioned S1 to S3 sequence.

The above-mentioned initial ranging (RNG-REQ) messages from the mobile stations 3 are call processing messages between the mobile stations 3 and base transceiver stations 2 and are communications that are not charged, so the initial ranging (RNG-REQ) messages have no influence on accounting information.

The mobile stations 3[a] to 3[e] return connection test results S4 to the base transceiver station 2[A] that has transmitted the connection test requests S1. The messages (signals) of the connection test results S4 each include whether a connection test to each base transceiver station of the test target has been successful, the base transceiver station of the test target has been indicated in the messages of the connection test requests S1.

In FIG. 1, for example, the base transceiver station 2[D] is placed in a "silent state" and does not return a connection test response S3 (S3'). The mobile station 3[c] provides notification indicating that the connection test has not been successful, to the base transceiver station 2[A] as a connection test result S4'.

The base transceiver station 2[A] notifies the maintenance and operation system 1 of the test results. In this way, the states of the base transceiver stations 2 are managed in the state detection system.

Figure 3B:
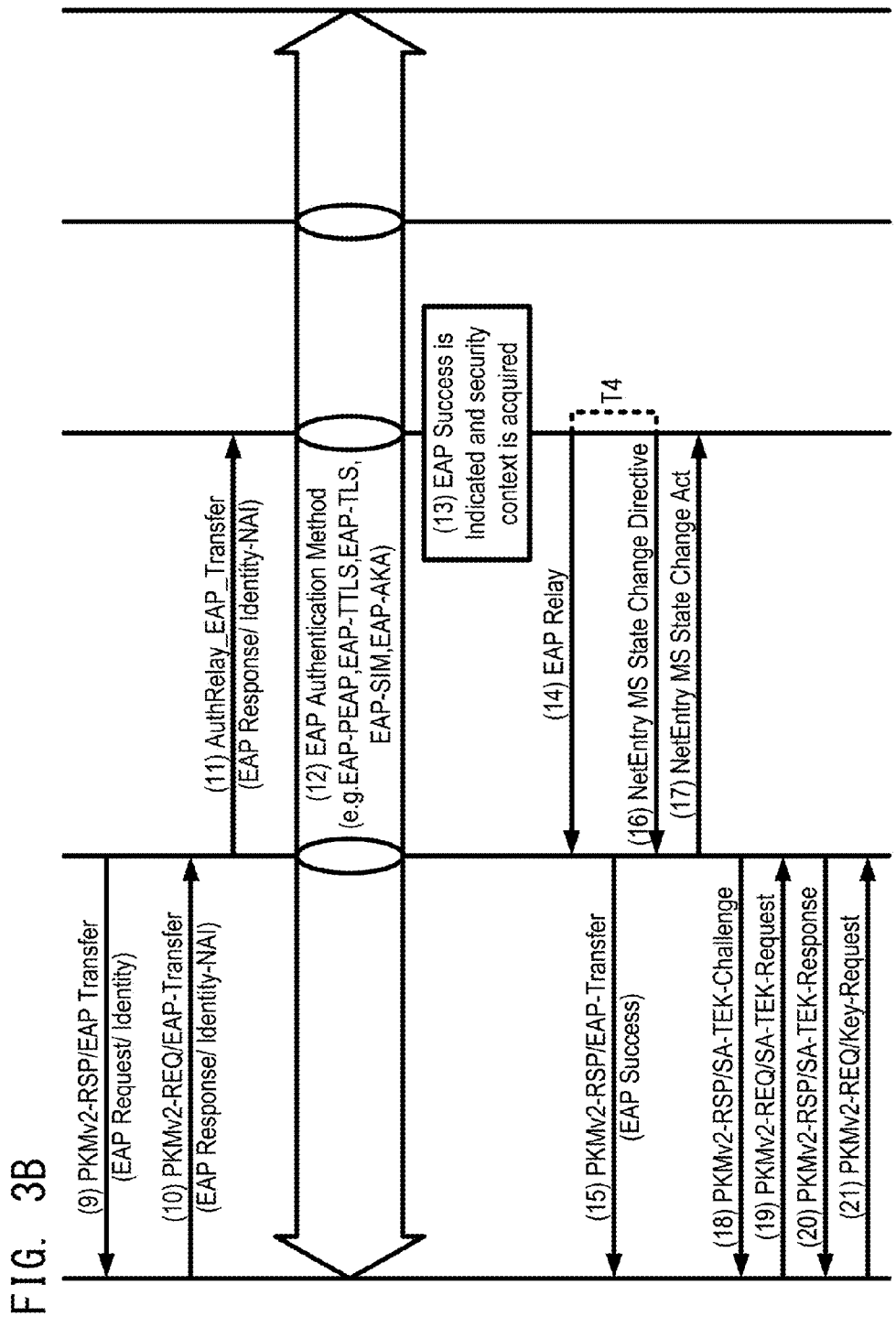

FIGS. 3A-3C are diagrams illustrating one example of a transmission sequence in WiMAX and are excerpts from Forum NWG Stage 2. In an example indicated in FIG. 3A, a portion surrounded by a broken line frame ((2) initial ranging and PHY adjustments process (RNG-REG/RSP)) is a portion where the transmission sequence of the above-mentioned initial ranging (RNG-REQ) message is executed.

As described above, the base transceiver stations 2 and mobile stations 3 transmit or receive the connection test requests S1 and the connection test results S4 so as to detect a "silent state".

It is desirable to process these messages in such a manner that these messages are distinguished from existing messages. It is conceivable to define new messages or to perform by adding identifiers to existing messages for distinguishing from existing messages.

In any case, the connection test requests S1 each include a list of base transceiver stations on which the mobile stations 3 are to perform connection tests. The connection test results S4 each include the test result to the base transceiver station 2 on which the mobile station 3 has performed a connection test.

The mobile stations 3 identify the base transceiver stations 2 that are included in the connection test requests S1 and are the targets of performance of connection tests, and perform the connection tests. The mobile stations 3 include the test results to each base transceiver station 2 into the connection test results S4 and transmit the connection test results S4 to the base transceiver station 2[A].

In the example indicated in FIG. 1, as described above, the instruction of the connection test request to the base transceiver station 2[A] and compilation of the test results are performed by the maintenance and operation system 1 that monitors and controls the base transceiver stations 2. Alternatively, a dedicated system for detecting the "silence state" in the system may be prepared.

In order to simplify the explanation, the example indicated in FIG. 1 is a illustrating where the maintenance and operation system 1 is connected to only the base transceiver station 2[A]; however, the maintenance and operation system 1 is originally connected to the all the base transceiver stations 2. Also, the maintenance and operation system 1 instructs connection tests on a base transceiver station 2 automatically or in accordance with an instruction operation from a maintenance worker. The base transceiver station 2, which has received the test request, transmits the above-mentioned connection test requests to mobile stations 3 and provides notification about the test results from the mobile stations 3 to the maintenance and operation system 1 as the test results.

In the example of FIG. 1, the base transceiver stations 2 on which the connection tests from the base transceiver station 2[A] have been successfully performed are 2[B], 2[C], 2[E], and 2[F]. As for the base transceiver station 2[D], the connection test has been unsuccessful. As for the base transceiver station 2[G], it is eliminated from the targets of determination of the connection test by checking the presence or absence of information indicating a field intensity measurement result from the each mobile station 3 in advance.

Figure 4:
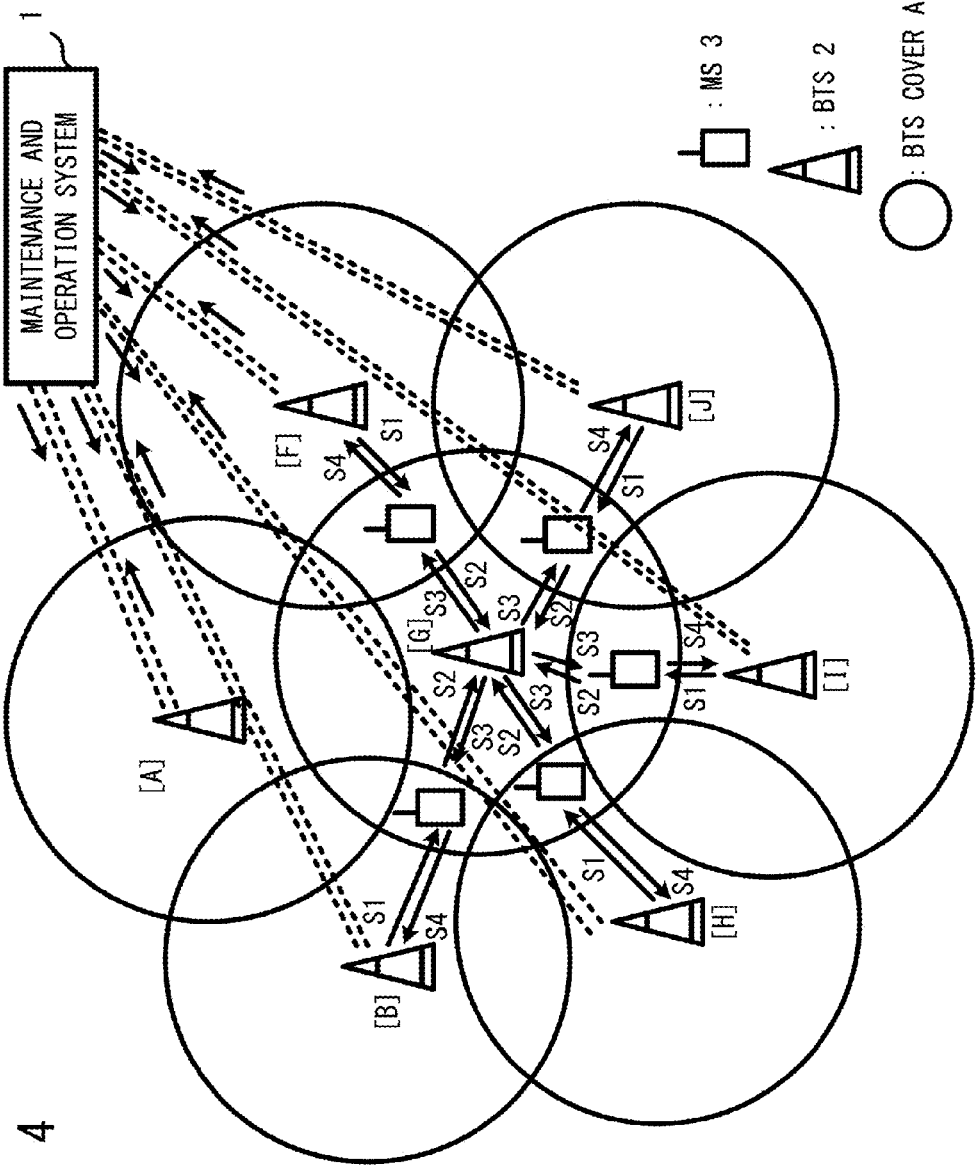
FIG. 4 is a diagram illustrating operations performed from an adjacent base transceiver station if a connection test cannot be performed from one base transceiver station.

In FIG. 1, there have been no mobile stations that a radio wave can reach, around the base transceiver station 2[G], so it has not been possible to perform a connection test from the base transceiver station 2[A]. In such a case, as indicated in FIG. 4, it is possible to perform connection tests identical to the base transceiver station 2[A] from the base transceiver stations 2[B], 2[F], 2[H], 2[I], and 2[J] adjacent to the base transceiver station 2[G] in the same way.

That is, if the maintenance and operation system 1 can confirm that a connection test from any base transceiver station 2 of the adjacent base transceiver stations has been successful by performing these connection tests on a plurality of base transceiver stations 2 from the maintenance and operation system 1, it can determine that the base transceiver station 2[G] is not placed in a "silent state".

On the other hand, if a connection test from any base transceiver station 2 of the adjacent base transceiver stations has been unsuccessful, the maintenance and operation system 1 can determine that there is a high possibility that the base transceiver station 2[G], which is the test target, is placed in a "silent state". If there is no mobile station 3 that can make a connection to the base transceiver station 2[G], the maintenance and operation system 1 may not make a determination of the connection test; however, it is possible to check the normality of the operation of the base transceiver stations without having to provide a test terminal at each base transceiver station 2.

In the above-mentioned embodiment, it is possible to detect a base transceiver station placed in a "silent state" at low cost and with efficiency without having to provide special hardware such as a test terminal at each base transceiver station.

By performing this connection test periodically repeatedly, it is possible to further detect a base transceiver station that does not make a response, namely the base transceiver station is placed in a "silent state".

Also, when a user complaint occurs, it is possible to perform this connection test on a base transceiver station 2 located in the area where the complaint has occurred to check whether the base transceiver station 2 is placed in a "silent state".

Hereafter, the embodiment will be described in detail in a manner corresponding to the above-mentioned basic operation.

Figure 5:
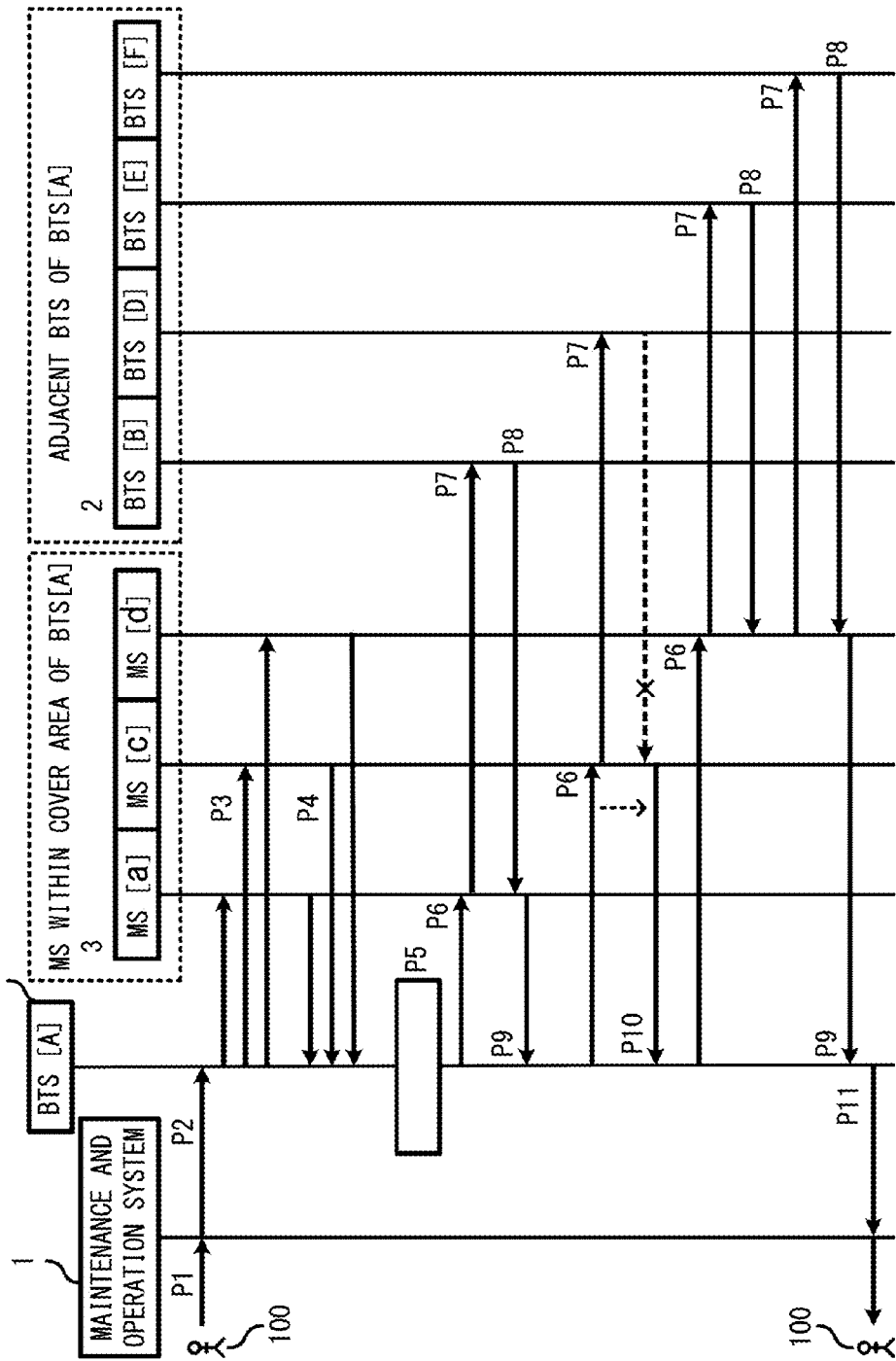
FIG. 5 is a diagram illustrating an example sequence of process in FIG. 1.

FIG. 5 is a diagram illustrating an example sequence of the processes indicated in FIG. 1.

In FIG. 5, (1) the base transceiver station 2[A] receives a test request from the maintenance and operation system 1 in accordance with an operation (process step P1) of a maintenance worker. (process step P2)

In accordance with the test request, the base transceiver station 2[A] first transmits field intensity measurement requests to all the mobile stations 3 existing within the cover area in order to search mobile stations 3 that can perform connection tests on adjacent base transceiver stations 2. (process step P3)

As methods for transmitting the field intensity measurement requests, there are a method of individually transmitting the field intensity measurement requests to only mobile stations 3 registered in the base transceiver stations 2 and a method of indiscriminately transmitting the field intensity measurement requests as broadcast information. It is possible to include information about base transceiver stations that will be measured by mobile stations 3 and are adjacent to the base transceiver station 2 [A], in the field intensity measurement request messages.

It is effective for this adjacent base transceiver station information to use adjacent base transceiver station information typically used when a hand-over process set in each base transceiver station 2 is performed.

(2) When the mobile stations 3 receive the field intensity measurement request message, the mobile stations 3 measure the field intensity of a radio wave from the adjacent base transceiver station that is the test target, and include the measurement result in a field intensity measurement result notification message and transmit the field intensity measurement result message to the base transceiver station 2[A]. (process step P4)

Note that as this process, a process performed when a hand-over is performed can be used and therefore the mobile stations 3 do not need to perform any special process as the embodiment.

(3) On the basis of the field intensity measurement results from the mobile stations 3, the base transceiver station 2[A] decides mobile stations 3 that are to perform connection tests and adjacent base transceiver stations that are to be test target of the connection tests. (process step P5)

As for a method of the decision in the process step P5, it is possible to decide to use a mobile station that has measured the largest one of the intensity of electric fields from the adjacent base transceiver stations, as a mobile station that is to perform a connection test. Also, if there is a base transceiver station having a field intensity lower than a field intensity that can be connected from all the base transceiver stations, the base transceiver station is eliminated from the test targets of connection tests. Also, if the field intensity of the adjacent base transceiver station 2[F] measured by the mobile station 3[$d$] indicated in FIG. 1 is higher than the result of the measurement made by the mobile station 3[$e$], it is possible to use the mobile station 3[$d$] as a mobile station that is to perform a connection test on the base transceiver station 2[F].

Also, if the mobile station that has measured the largest one of the field intensities measured from the adjacent base transceiver station 2[E] is the mobile station 3[$d$], it is possible to use the mobile station 3[d] as a mobile station that is to perform connection tests on the base transceiver station 2[E] and base transceiver station 2[F].

(4) The base transceiver station 2[A] transmits connection test request messages including information about the adjacent base transceiver stations that are the test targets, to the mobile stations 3 decided to be used as mobile stations that are to perform connection tests. (process step P6)

(5) The mobile stations 3 that have received the connection test requests perform connection tests on the specified test targets within the adjacent base transceiver stations. (process step P7)

The sequence example of FIG. 5 indicates an example where the mobile station 3[a] of FIG. 1 performs a connection test on the base transceiver station 2[B], the mobile station 3[c] performs a connection test on the base transceiver station 2[D], and the mobile station 3[d] performs connection tests on the base transceiver station 2[E] and base transceiver station 2[F].

(6) The base transceiver stations 2 that have received the connection tests from the mobile stations 3 transmit connection test response messages to the mobile stations 3. (process step P8)

(7) The mobile stations 3 that have received the connection test response messages from the base transceiver stations 2 that are the test targets, each transmit connection test result notification to the base transceiver station 2[A]. (process step P9)

If there is the base transceiver station 2[D] that has not made a response to a connection test from the mobile terminal 3[c], like indicating in FIG. 1, the mobile terminal 3 provides a test result indicating that the connection test has been NG, upon time-out of a predetermined time of a timer. (process step P10)

While the time-out of the timer time is indicated as an example in FIG. 5, it is also possible to retry the connection test multiple times and then determine that the connection tests have been NG.

(8) The base transceiver station 2[A] provides notification about the test results from the mobile stations 3 to the maintenance worker 100 or maintenance system 1. (process step P11)

While the sequence is indicated in FIG. 5 in such a manner that the base transceiver station 2 connected to the maintenance and operation system 1 is narrowed down to only the base transceiver station 2[A], it is possible to verify the certainty of a "silent state" by performing same connection tests from a plurality of base transceiver stations 2 as indicated in FIG. 4.

Second Embodiment

While an example where tests are performed in response to a request operation of the maintenance worker 100 (process step P1) is indicated in the first embodiment, it is also possible for the maintenance and operation system 1 to perform tests autonomously periodically.

Figure 6:
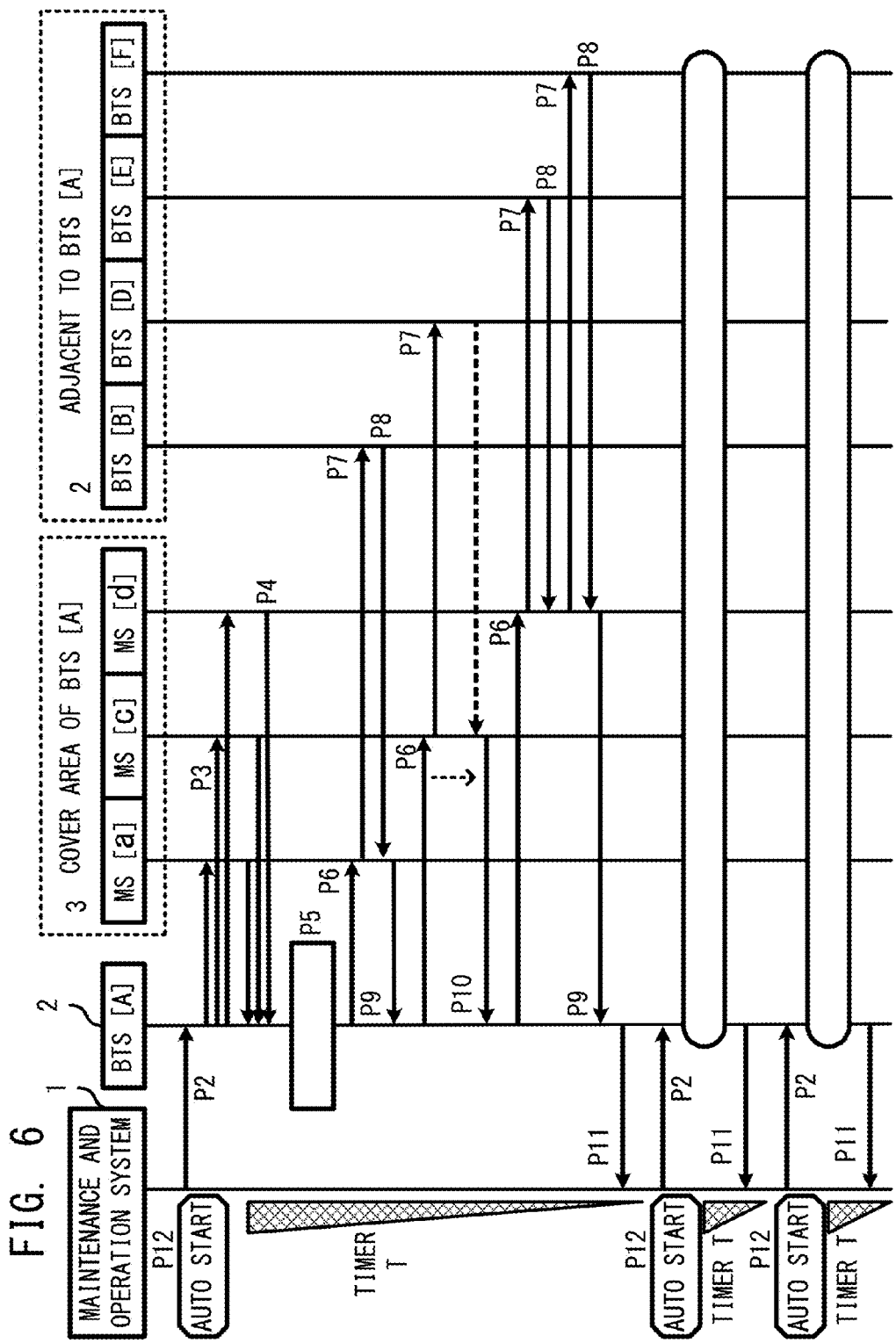
FIG. 6 is a diagram illustrating a sequence of processes performed every predetermined time T in a case where a maintenance and operation system includes a timer.

FIG. 6 is a diagram illustrating a sequence of processes performed every predetermined time T in a case where the maintenance and operation system 1 includes a timer.

That is, the maintenance and operation system 1 automatically starts in accordance with the timer every predetermined time T rather than being started by the maintenance worker 100. (process step P12)

And the maintenance and operation system 1 transmits the connection test request messages to the base transceiver station 2[A]. (process step P2)

Other steps are substantially same as the sequence of FIG. 5. Also, the maintenance and operation system 1 may start at a specified date and time in accordance with a scheduler instead of the timer for measuring the time every predetermined time, and the maintenance and operation system 1 transmits the connection test request messages to the base transceiver station 2[A]. (process step P2)

Figure 7:
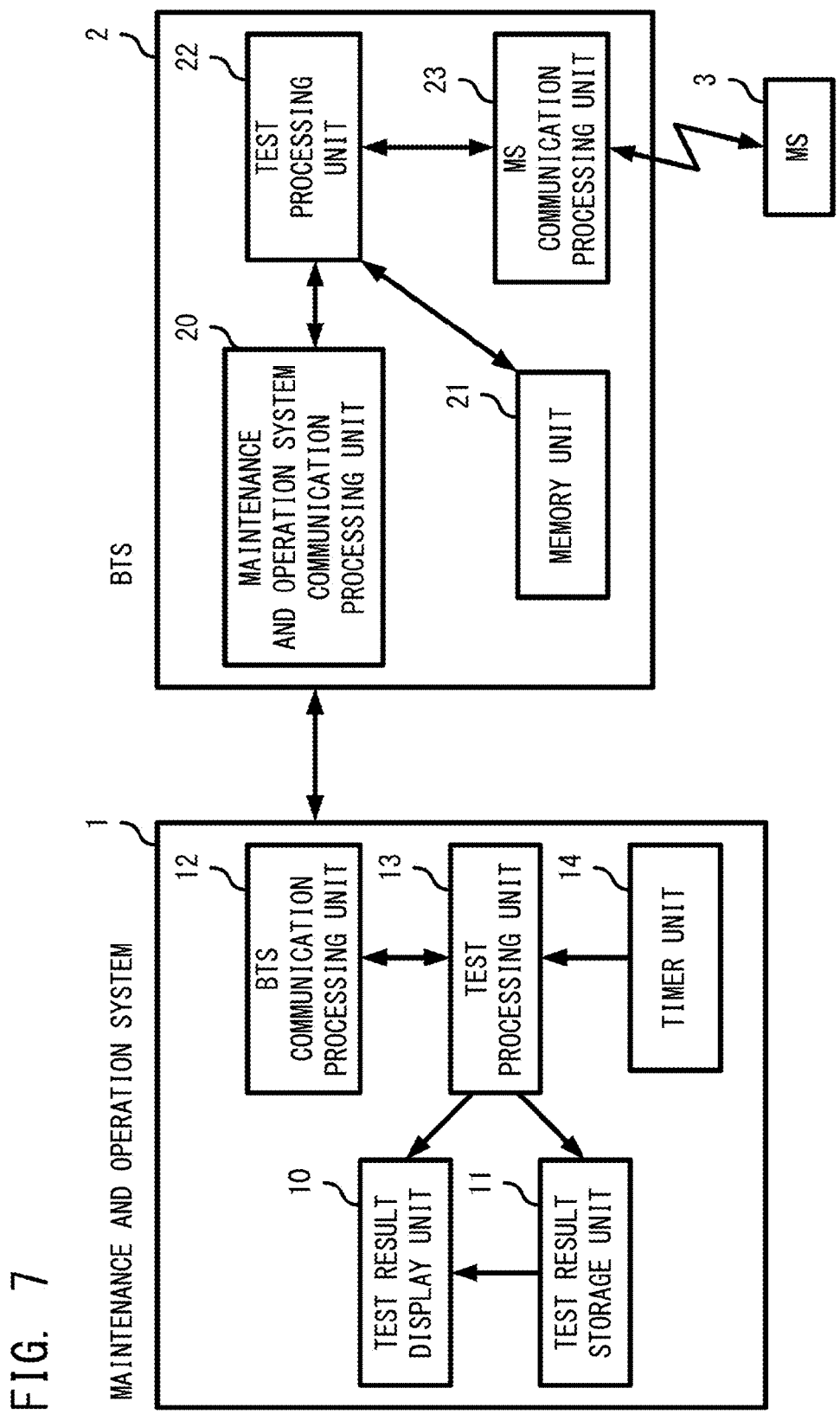
FIG. 7 is a diagram illustrating an example configuration of the maintenance and operation system and base transceiver station.

FIG. 7 is a diagram illustrating an example configuration of the maintenance and operation system 1 and base transceiver station 2[A] to 2[E].

The maintenance and operation system 1 includes a test result display unit 10, a test result storage unit 11, a base transceiver station communication processing unit 12, a test processing unit 13, and a timer unit 14.

The test result display unit 10 displays the results of performed tests on a client screen or the like for the maintenance worker 100 of the maintenance and operation system 1. The maintenance worker 100 can see the test results from the displayed contents.

The test result storage unit 11 stores the results of performed tests so that the past test situations can be checked.

The base transceiver station communication processing unit 12 is a part that processes messages with the base transceiver stations 2[A] to 2[E] and performs a protocol conversion process. Messages for performing tests are exchanged with the base transceiver stations 2[A] to 2[E] via this processing unit. When an error occurs in a message, a retransmission process or the like is also performed by the base transceiver station communication processing unit 12.

The test processing unit 13 performs a test for detecting the "silence state". The test processing unit 13 performs transmission of messages for performance of tests, a test result reception process, and the like.

The timer unit 14 autonomously instructs the maintenance and operation system 1 to start the connection test indicated in FIG. 6.

On the other hand, the base transceiver station 2[A] to 2[E] includes a maintenance and operation system communication processing unit 20, a memory unit 21, a test processing unit 22, and a mobile station communication processing unit 23.

The maintenance and operation system communication processing unit 20 performs message processing with the maintenance and operation system 1, a protocol conversion process, and the like. The maintenance and operation system communication processing unit 20 performs a process of receiving a test request message (signal) from the maintenance and operation system 1 and a process of transmitting test result notification message (signal) to the maintenance and operation system 1.

Also, the maintenance and operation system communication processing unit 20 performs processing of a message error with the maintenance and operation system 1, and the like.

The memory unit 21 is a memory that stores such as information about adjacent base transceiver stations for use in a hand-over process.

The test processing unit 22 receives a test request message (P2) from the maintenance and operation system 1 and, on that occasion, transmits connection test request messages (P3) to the mobile stations 3[a] to 3[d].

Also, when transmitting messages, the test processing unit 22 also performs a process of reading, from the memory unit 21, information about adjacent base transceiver stations that are the test targets and including the adjacent base transceiver station information in the messages. Also, the test processing unit 22 performs a process of extracting the test results from connection test result messages (P9) received from the mobile stations 3[a] to 3[d], generating a message to the maintenance and operation system 1, and transmitting the message thereto.

The mobile station communication processing unit 23 performs a process of communicating with the mobile stations 3[a] to 3[d] and processes test messages and other messages with the mobile stations. The mobile station communication processing unit 23 is a part, the protocol or technology used in which varies among mobile communication systems.

Figure 8:
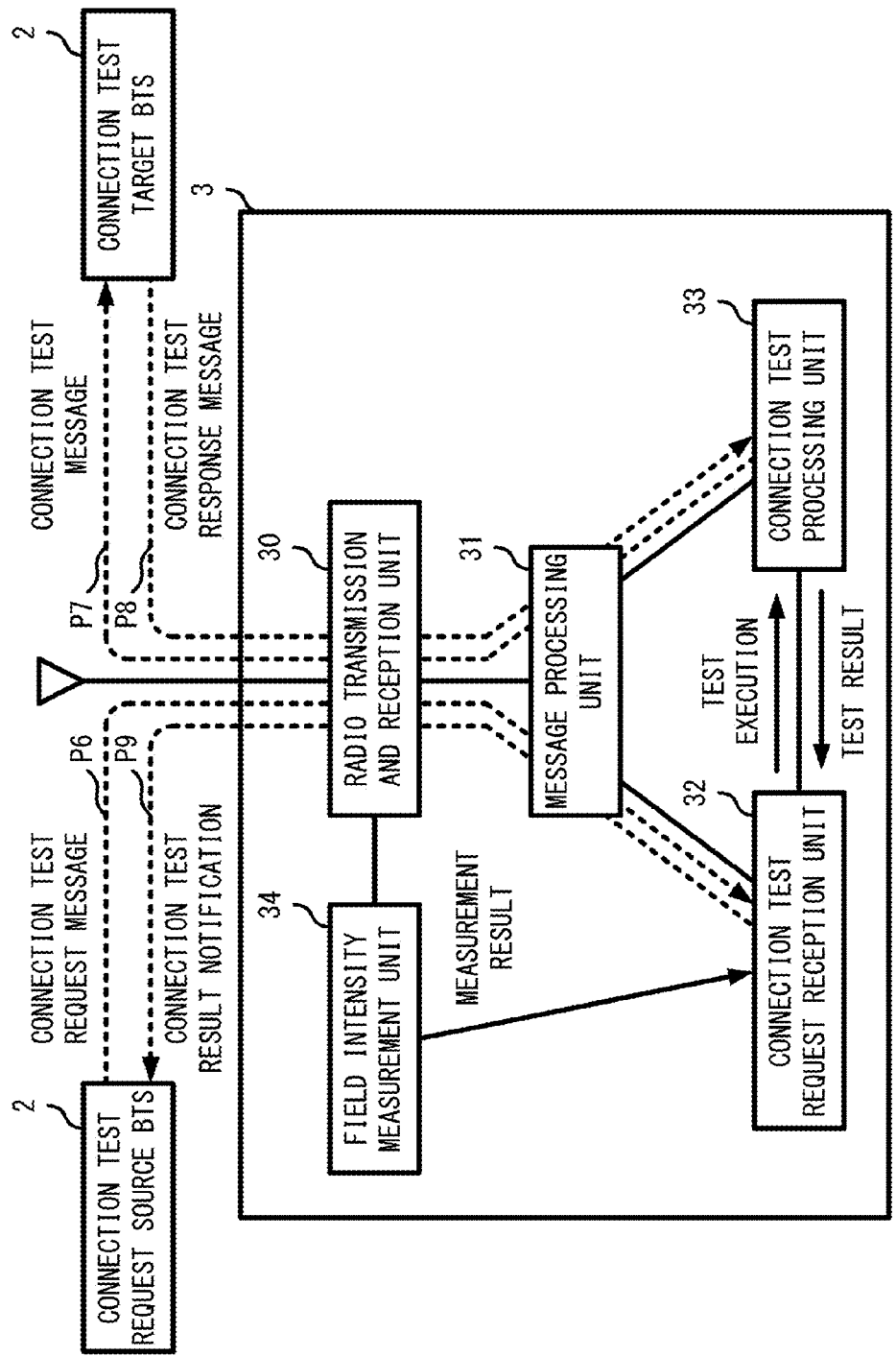
FIG. 8 is a diagram illustrating an example configuration of a mobile station.

FIG. 8 is a diagram illustrating an example of a configuration of the mobile stations 3. A radio transmission and reception unit 30 processes transmission and reception of radio data used when communicating with a base transceiver station, which is a connection test request source, and base transceiver stations, which are the test targets.

A message processing unit 31 serves as an interface between a connection test request reception unit 32 and a connection test processing unit 33 so as to process messages necessary in the embodiments in addition to messages that the mobile station normally processes.

A field intensity measurement unit 34 measures the field intensity of a radio wave that the mobile station receives, the normal mobile station 3 includes the field intensity measurement unit 34.

The connection test request reception unit 32 performs a process of receiving a message from a base transceiver station requesting a connection test and instructs the connection test processing unit 33 to perform a test. Also, the connection test request reception processing unit 32 notifies of the test result to the source base transceiver station of request.

In accordance with the connection test instruction from the connection test request reception unit 32, the connection test processing unit 33 performs a connection test on a base transceiver station that is the test target. Also, the connection test processing unit 33 notifies the connection test request reception unit 32 of the test result.

Figure 9:
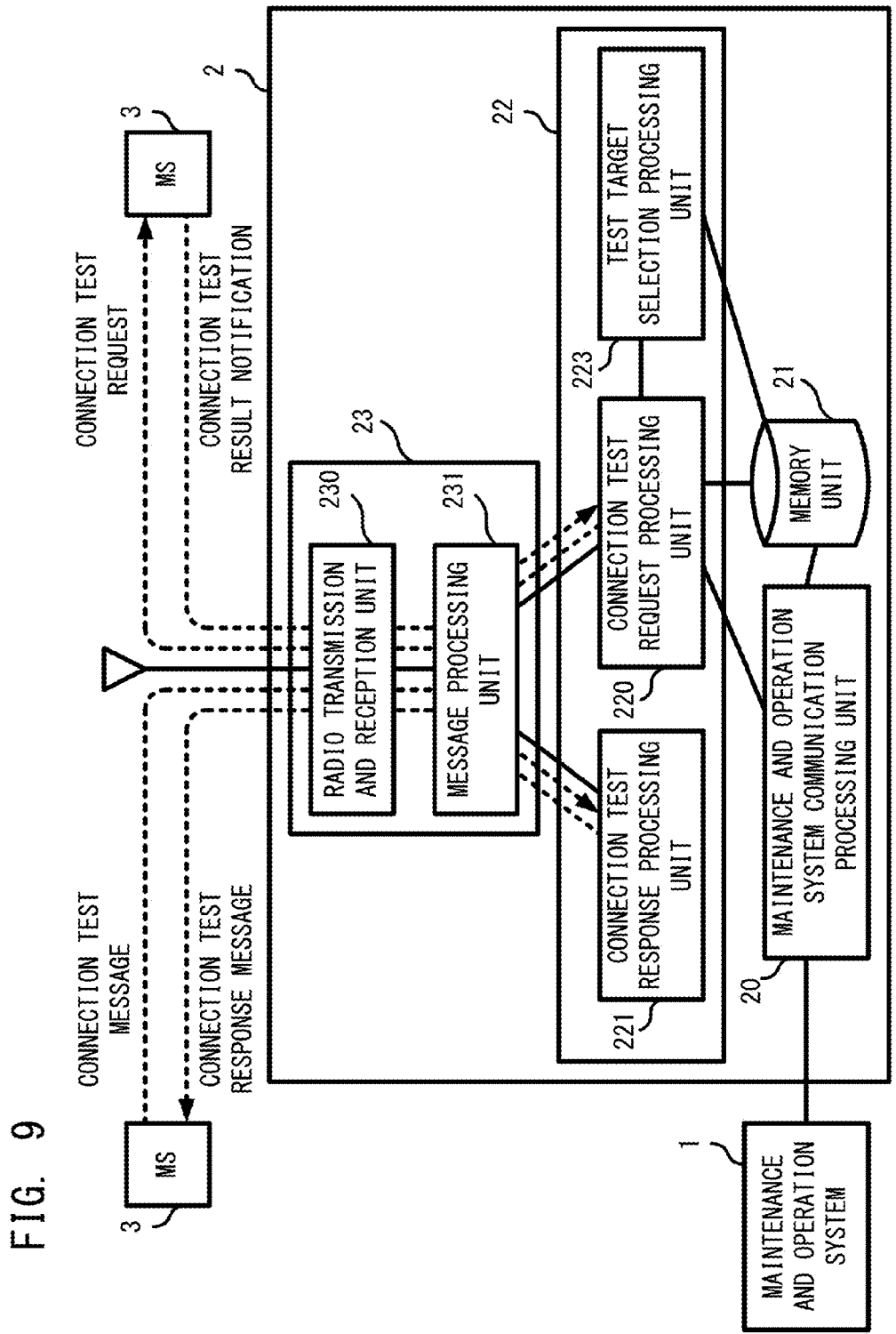
FIG. 9 is a diagram illustrating the more detailed configuration of the base transceiver station indicated in FIG. 7.

FIG. 9 is a diagram illustrating the configuration of the base transceiver station 2 indicated in FIG. 7 in relation to mobile stations 3 in more detail.

The mobile station communication processing unit 23 includes a radio transmission and reception unit 230 and a message processing unit 231. The test processing unit 22 includes a connection test request processing unit 220, a connection test response processing unit 221, and a test target selection processing unit 223.

The radio transmission and reception unit 230 performs transmission and reception of radio data used when communicating with a mobile station 3. The message processing unit 231 performs a process of interfacing between the connection test request processing unit 220 and the connection test response processing unit 221 so as to process the above-mentioned necessary messages in addition to messages that the base transceiver station normally processes.

A maintenance and operation system communication processing unit 20 performs a process of communicating with the maintenance and operation system 1.

The connection test request processing unit 220 receives a test request message from the maintenance and operation system communication processing unit 20. Also, the connection test request processing unit 220 transmits a field intensity measurement instruction and a connection test request to a mobile station 3 located within the cover area via the mobile station communication processing unit 23.

The test target selection processing unit 223 performs a process of selecting a base transceiver station 2 to be a test target, based on the field intensity measurement result.

The connection test response processing unit 221 performs a process of making a response to a connection test message from a mobile station 3.

The memory unit 21 stores, for example, various types of information below:

information about adjacent base transceiver stations that are the test targets of field intensity tests;

field intensity data that are the results of field intensity tests;

connection test result for each adjacent base transceiver station;

data about base transceiver stations that are the test targets; and historical data or the like of mobile stations that have performed tests.

Third Embodiment

Although not shown, the maintenance and operation system 1 is monitoring statistic information such as the number of user (mobile station) connections of the base transceiver stations 2[A] to 2[E] by monitoring traffic. For example, it is possible to automatically perform a connection test on a base transceiver station with respect to which the user connection number has become zero and that state has continued over a predetermined time, from a base transceiver station adjacent to the base transceiver station. Alternatively, it is conceivable to add the number of failures of hand-over to a particular base transceiver station as a condition.

Figure 10:
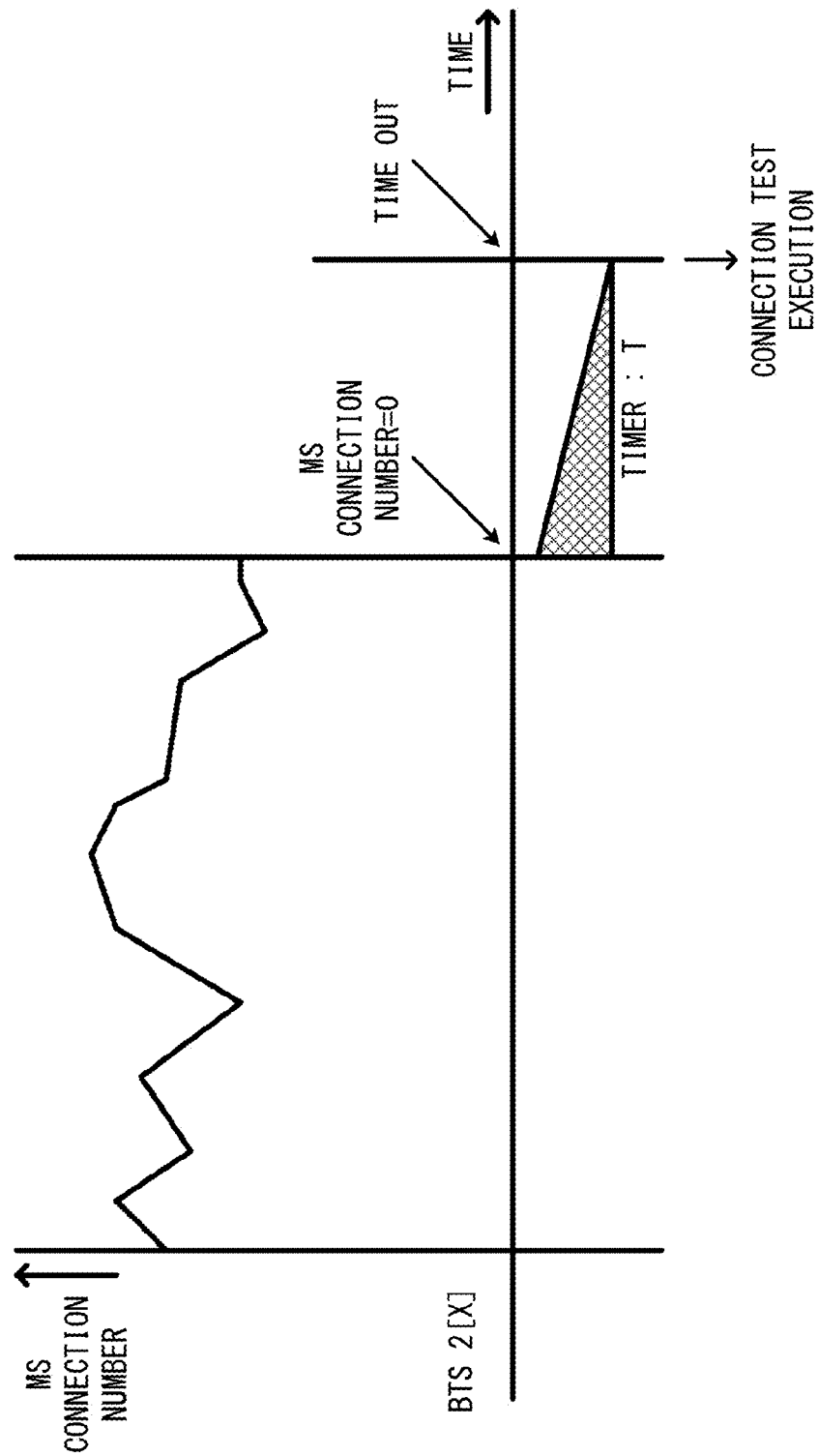
FIG. 10 is a diagram illustrating an example where a base transceiver station considered to be placed in a "silent state" based on the number of user connections of a base transceiver station is detected and performing a connection test based on the detection.

FIG. 10 is a diagram illustrating an example where a base transceiver station that can be considered to be placed in a "silent state" based on the number of user connections of the base transceiver station is detected and the detection is used as a trigger for performing a connection test.

In FIG. 10, the lateral axis represents the time and the longitudinal axis represents the user (mobile station) connection number.

When the user connection number becomes zero at a base transceiver station 2[X], the timer starts. When a timer time T expires, a connection test is performed on the base transceiver station 2[X]. At that time, a base transceiver station that performs a test is a base transceiver station adjacent to the base transceiver station 2[X]. Note that it is possible to obtain information about the adjacent base transceiver station from a list of base transceiver stations that are normal hand-over destinations.

Figure 11:
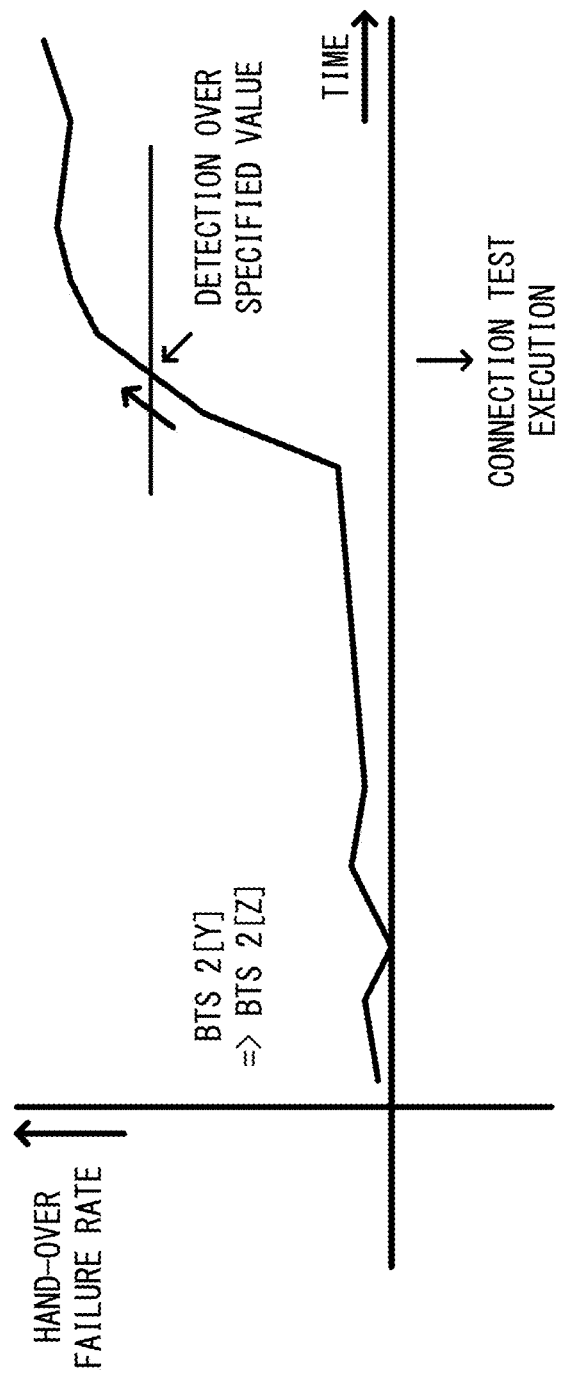
FIG. 11 is a diagram illustrating an example where a base transceiver station considered to be placed in a "silent state" based on a hand-over failure rate is detected.

FIG. 11 is a diagram illustrating an example where a base transceiver station that can be considered to be placed in a "silent state" based on a hand-over failure rate is detected. If the rate of failure of hand-over to a base transceiver station 2[Z] is equal to or higher than a specified value, it is determined that the base transceiver station 2[Z] may be placed in a "silent state" and then the base transceiver station 2[Z] becomes the target of connection test. In this case, too, a connection test request is issued to a target base transceiver station 2[Y] obtained from the list of base transceiver stations, which are hand-over destinations.

Figure 12:
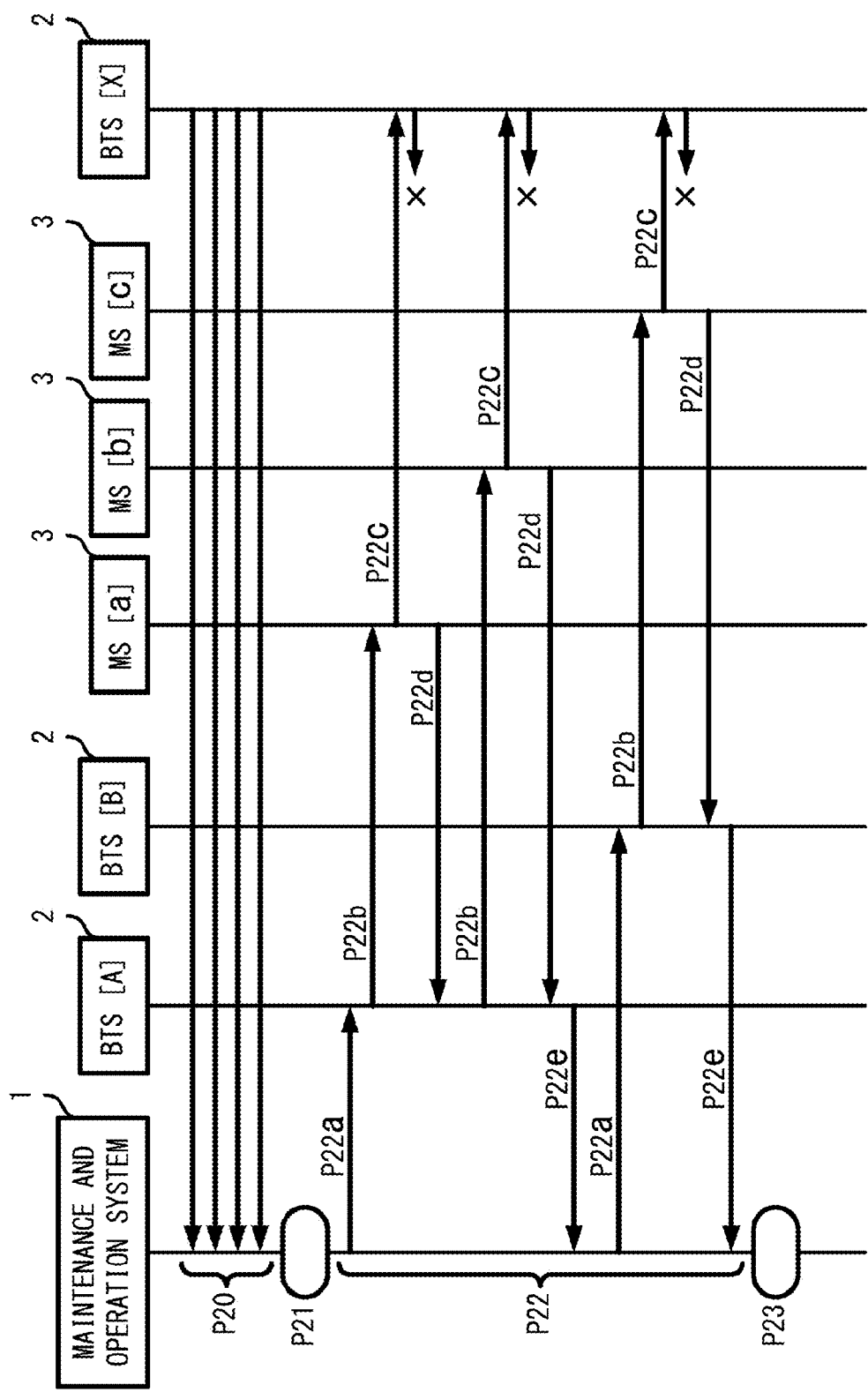
FIG. 12 is an example of a sequence from the detection of an abnormality in performance data to the performance of a connection test.

FIG. 12 is an example of the above-mentioned sequence from the detection of an abnormality in performance data to the performance of a connection test.

The maintenance and operation system 1 collects data about the performance of each base transceiver station. (process step P20)

It is assumed that an abnormality as indicated in FIG. 10 or FIG. 11 is detected in the data about the performance of the base transceiver station [X]. (process step P21)

The maintenance and operation system 1 issues a test request instruction to a base transceiver station 2 adjacent to the base transceiver station 2[X]. (process step P22a)

The base transceiver stations 2[A] issues connection test requests to mobile stations 3[a] and 3[b] placed in the charge thereof and the base transceiver station 2[B] issues a connection test request to the mobile station 3[c] placed in the charge thereof. (process step P22b)

Next, the mobile stations 3[a], 3[b], and 3[c] each perform a connection test on the base transceiver station 2[X] that is the test target. (process step P22c)

In an example indicated in FIG. 12, there is indicated an example where all of the mobile stations 3[a], 3[b], and 3[c] have failed in connection test. The mobile stations 3 each issue result notification indicating that the test results have been all NG to the corresponding base transceiver stations 2[A] and 2[B]. (process step P22d).

The base transceiver stations 2[A] and 2[B] each notify the maintenance and operation system 1 that all of the connection tests have been NG. (process step P22e)

If all of the connection tests have been NG, the maintenance and operation system 1 provides notification indicating that a "silent state" has been detected to the maintenance worker 100. (process step P23)

The state of an adjacent base transceiver station can be detected using a mobile station. This makes it possible to detect a "silent state" of a base transceiver station at low cost and with efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio device for communicating with a mobile station located in a radio propagation area of a first base transceiver station, the radio device comprising:
    a test target selection processing unit for identifying a mobile station located in an area covered with both the radio propagation area of the first base transceiver station and a radio propagation area of a second base transceiver station; and
    a test request processing unit for transmitting a test request signal having information concerned with the second base transceiver station to the mobile station identified by the test target selection processing unit so that the mobile station executes and sends a connection test to the second base transceiver station, and for processing a connection test result signal received from the mobile station,
    wherein the test request processing unit starts a timer when a number of mobile stations in the radio propagation area of the second base transceiver station is 0, and transmits the test request signal to the identified mobile station after a specified time has passed.

2. A state detection method in a first base transceiver station for communicating with a mobile station located in a radio propagation area of the first base transceiver station, the state detection method comprising:
    identifying a mobile station located in an area covered with the radio propagation area of the first base transceiver station and a radio propagation area of a second base transceiver station;
    transmitting, from the first base transceiver station, a connection test request signal having information concerned with the second base transceiver station to the identified mobile station;
    detecting a response signal for the connection test request signal from the identified mobile station indicating a result of the identified mobile station executing a test, including connecting with the second base transceiver station, based on the connection test request signal,
    wherein the transmitting the connection test request signal starts a timer when a number of mobile stations in the radio propagation area of the second base transceiver station is 0, and transmits the connection test request signal to the identified mobile station after a specified time has passed.

3. The state detection method according to claim 2, wherein the information concerned with the second base transceiver station is used for a hand-over processing.

4. The state detection method according to claim 2, wherein the transmitting transmits the connection test request signal at specified times based on a timer.

5. The state detection method according to claim 2, wherein the transmitting transmits the connection test request signal having information concerned with the second base transceiver station having rate of failure of a hand-over processing that is greater than or equal to a specified value.

6. A state detection system for detecting a state of a second base transceiver station, the state detection system comprising:
    a maintenance and operation system for requesting, to a first base transceiver station, a connection test between a mobile station and the second base transceiver station;
    the first base transceiver station for requesting the connection test of the mobile station located in an area covered with both a radio propagation area of the first base transceiver station and a radio propagation area of the second base transceiver station, the connection test request having information concerned with the second base transceiver station, based on the connection test request from the maintenance and operation system; and
    the mobile station for executing and sending the connection test to the second base transceiver station based on the connection test request and the information from the first transceiver station, for detecting a response to the connection test from the second base transceiver station, and for transmitting the response to the first base transceiver station,
    wherein the maintenance and operation system starts a timer when a number of the mobile stations in the radio propagation area of the second base transceiver station is 0, and requests the connection test to the first base transceiver station after a specified time has passed.

7. The state detection system according to claim 6, wherein the first base transceiver station requests the connection test of the mobile station taking with the information used for a hand-over processing.

8. The state detecting system according to claim 6, wherein the maintenance and operation system requests the connection test of the first base transceiver station at specified times based on a timer.

9. The state detecting system according to claim 6, wherein the maintenance and operation system identifies a base transceiver station having rate of failure of a hand-over processing that is greater than or equal to a specified value with the second base transceiver station.

10. The state detection method according to claim 2, wherein when a number of user connections at the second base transceiver station becomes zero, a timer starts and the transmitting transmits the connection test request signal to the identified mobile station after a specified time has passed.

11. The state detection method according to claim 2, wherein the detecting further includes detecting a response signal for the connection test request signal from the second base transceiver station.

12. The state detecting system according to claim 6, wherein the maintenance and operation system starts a timer when a number of user connections at the second base transceiver station becomes zero, and requests the connection test to the first base transceiver station after a specified time has passed.

13. The radio device according to claim 1, further comprising:
    a memory; and
    a processor coupled to said memory, wherein the radio device is in a base transceiver station.

* * * * *